Nov. 17, 1964 D. GLASER 3,157,838

DESTRUCTIVE READOUT OF DELAY LINE

Filed Nov. 13, 1961

INVENTOR.
DAVID GLASER
BY Robert A. Green
ATTORNEY

United States Patent Office 3,157,838

Patented Nov. 17, 1964

3,157,838

DESTRUCTIVE READOUT OF DELAY LINE

David Glaser, Greenbrook, N.J., assignor to Burroughs Corporation, Detroit, Mich., a corporation of Michigan Filed Nov. 13, 1961, Ser. No. 151,834
4 Claims. (Cl. 328—121)

This invention relates to information transmission circuits and, particularly, to the use of delay lines for storing and transmitting signal information.

It is common practice to use a delay line for storing electrical signals for a period of time and then, at some predetermined time, extracting all of the information and transmitting it to a suitable utilization circuit. A problem arises in this type of circuit when some of the signal energy remains in the delay line after the readout operation has taken place. Such remaining signal energy may appear as spurious output signals and may thus introduce inaccuracies in the operation of the circuit.

Accordingly, the objects of the invention are concerned with the provision of an improved delay line readout circuit in which signals which are read out are prevented from providing spurious output.

Briefly, according to the invention, a delay line having a plurality of output taps is provided with a gate adjacent to, and just ahead of, each output tap. Normally, the gates are open, i.e., normally conductive, and allow signal pulses to be transmitted along the delay line to their appropriate output taps. Means are also provided for closing, i.e., rendering nonconductive, the gates at a predetermined time after signal readout has occurred, to prevent any remaining signal energy from being transmitted along the delay line to other output taps.

The invention is described in greater detail by reference to the drawing wherein.

Figure 1:
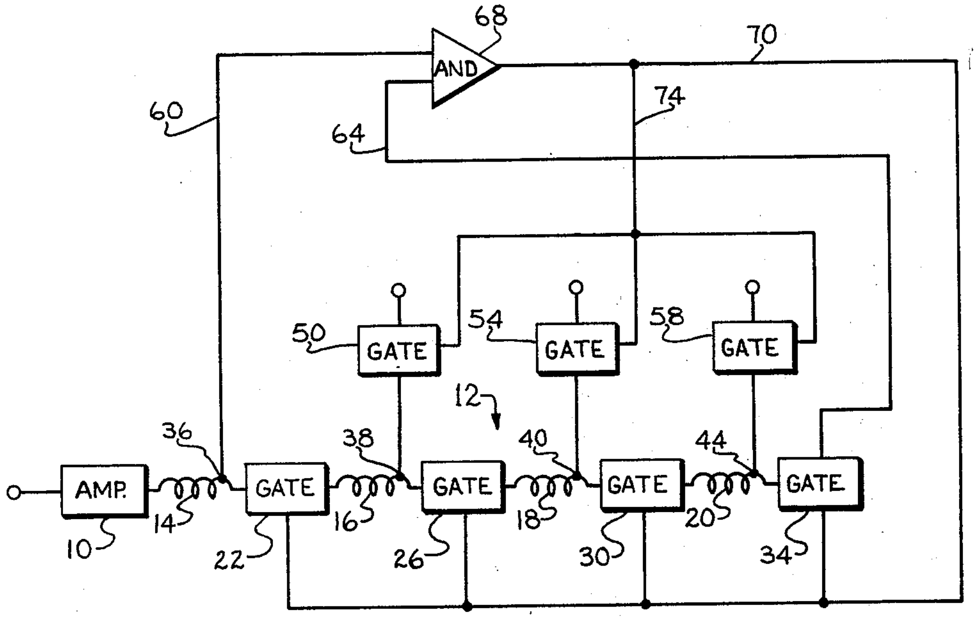
FIG. 1 is a schematic representation of a circuit embodying the invention.

Referring to the drawing, the circuit includes an input driver amplifier 10 which is coupled to a delay line 12 which comprises a plurality of signal transmission sections 14, 16, 18, and 20. Section 14 is coupled to section 16 by a gate 22; section 16 is coupled to section 18 by a gate 26; section 18 is coupled to section 20 by a gate 30; and section 20 terminates in a gate 34. Any number of delay line sections and gates may be provided, the number shown being merely illustrative of the invention. The gates 22, 26, 30, and 34, and others described below, may be tubes or transistors or the like having a plurality of control electrodes, by means of which they may be turned on and off in accordance with the operation of the invention, as described below.

Each section of the delay line is provided with a terminal or tap 36, 38, 40, and 44, respectively, from which an electrical signal may be transmitted, and each of terminals 38, 40, and 44 is coupled to a separate signal readout gate, 50, 54, 58, each of which includes an output terminal which may be connected to any suitable utilization circuit.

The output tap 36 and gate 34 are connected through leads 60 and 64, respectively, to an "and," sometimes hereinafter referred to as AND, gate 68, the output of which is coupled through lead 70 to a control electrode in each gate 22, 26, 30, and 34 and through lead 74 to a suitable control element in each of the readout gates 50, 54, and 58.

In one mode of the operation of the invention, it is assumed that a plurality of signal elements are transmitted into the delay line by amplifier 10, the signal elements (FIG. 2) including first and last bracket pulses 80 and 82 and three intermediate signal pulses 84, 86, and 88.

The signal pulses and bracket pulses are so spaced in time that, when they are transmitted into the delay line, they pass through the normally open gates 22, 26, 30, and 34. At some instant, the bracket pulses are at the tap 36 and gate 34 and the three signal pulses are at the output taps 38, 40, and 44 of the delay line. At this instant, the two bracket pulses operate the "and" gate and produce an output signal on lead 74 which opens the readout gates 50, 54, 58 and transmits the information from the delay line to the selected utilization apparatus. At the same time, the output of the "and" gate, through lead 70, closes the gates 22, 26, 30, and 34 and prevents any signal energy remaining in the delay line from passing along the line and providing spurious output signals at any of the output taps.

Figure 2:
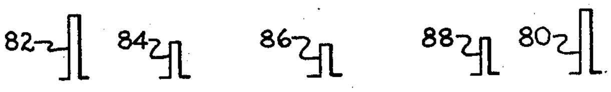
FIG. 2 shows a typical group of signals which might be stored and transmitted by the circuit of FIG. 1.

It is apparent, of course, that the pulse pattern of FIG. 2 is purely illustrative and that other predetermined pulse patterns traveling in the delay line 12 in response to the serial application of input pulses via amplifier 10 could be utilized to selectively actuate "and" gate 68. The operation of applicant's signal transmission circuit utilizing the pair of bracket pulses 80 and 82, as hereinbefore explained, comprises one such predetermined pulse pattern. When the pair of bracket pulses 80 and 82 appear at gate 34 and terminal 36, respectively, "and" gate 68 is activated, thereby generating a control signal which is applied via lines 70 and 74 to close the associated gates. By coupling the input lines 60 and 64 of "and" gate 68 to other points along the delay line 12, other predetermined pulse patterns appearing in the delay line could be utilized to selectively actuate "and" gate 68 and thereby generate a control signal for closing the normally open gating means of applicant's signal translating circuit.

It is clear that the output terminals 36, 38, 40, and 44 are spaced from the gates 22, 26, 30, and 34, a distance sufficient to compensate for the time required for the output of the "and" gate to travel along line 70 to the gates. It is understood that the gates should be closed in time, and for the length of time required, to prevent any remnants of the transmitted signal pulses from passing along the line to output terminals other than those from which they are intended to be transmitted.

The present invention thus provides a circuit for the destructive readout of a delay line wherein desired signal transmission is achieved with spurious signal transmission being prevented.

What is claimed is:

1. A signal storing and transmitting circuit comprising a delay line including a plurality of output taps by means of which signals may be extracted from said delay line;
   - said delay line being adapted to receive a plurality of signal pulses enclosed by a pair of bracket pulses;
   - a gate positioned in said line adjacent to each of said output taps;
   - output means coupled to said line for extracting said pair of bracket pulses;
   - an AND gate coupled to said output means and adapted to receive said bracket pulses and provide a control signal therefrom;
   - said control signal being coupled to said gates for rendering said gates nonconductive after the desired signals have been removed from said delay line.

2. The circuit defined in claim 1 and including a readout gate coupled to each output tap from which a signal pulse is derived, the control signal generated by said AND gate being coupled to each of said readout gates.

3. A signal transmission circuit comprising
   - a delay line having a plurality of output taps spaced apart along its length by means of which signals may be extracted from said delay line,
   - a like plurality of normally conductive gates in said delay line, each gate being positioned following its tap so that signals transmitted through the delay line pass serially past each ouput tap and through the gate following the tap, and AND gate means responsive to at least a pair of signals extracted from said delay line for developing a control signal for rendering said normally conductive gates nonconductive whereby any signal energy thereafter arriving at any of said output taps is prevented by said nonconductive gates from continuing its travel through the delay line to other output taps.

4. The circuit of claim 3 additionally including normally conductive output gating means coupled to selected ones of said taps for gating signals therefrom and wherein said output gating means are rendered nonconductive simultaneously with said gates in said delay line by said control signal.

References Cited in the file of this patent

UNITED STATES PATENTS

| | | |
|---|---|---|
| 2,403,561 | Smith | July 9, 1946 |
| 2,429,632 | Lair | Oct. 28, 1947 |
| 2,827,566 | Lubkin | Mar. 18, 1958 |
| 2,942,145 | Sleeper | June 21, 1960 |

FOREIGN PATENTS

| | | |
|---|---|---|
| 588,693 | Canada | Dec. 8, 1959 |